United States Patent [19]
Aratani

[11] Patent Number: 5,009,691
[45] Date of Patent: Apr. 23, 1991

[54] METHOD OF BENDING GLASS PLATE
[75] Inventor: Shin-ichi Aratani, Taki, Japan
[73] Assignee: Central Glass Company, Limited, Ube, Japan
[21] Appl. No.: 497,853
[22] Filed: Mar. 23, 1990
[30] Foreign Application Priority Data
 Mar. 24, 1989 [JP] Japan ............................... 1-73339
 Mar. 31, 1989 [JP] Japan ............................... 1-80537
[51] Int. Cl.$^5$ .......................................... C03B 23/023
[52] U.S. Cl. .......................................... 65/106; 65/107; 65/273
[58] Field of Search ........................... 65/106, 107, 273
[56] References Cited
U.S. PATENT DOCUMENTS
 3,340,037 9/1967 Stevenson ............................. 65/107
 4,726,832 2/1988 Kajii et al. ............................. 65/273

*Primary Examiner*—Joye L. Woodard
*Attorney, Agent, or Firm*—Fleit, Jacobson, Cohn, Price, Holman & Stern

[57] ABSTRACT

The invention provides an improved method of heating a glass plate for bending the glass plate into a predetermined shape having a radius of curvature not greater than 3000 mm, and not greater than 2000 mm if the glass plate is thinner than 6 mm. The glass plate is heated in its entirety in a usual manner, and during the heating at least one end region of the glass plate is additionally heated by forced convection such that the heat transfer coefficient on at least one major surface of the glass plate in the end regions(s) becomes greater than in the remaining region by 5–50 kcal/m$^2$·h·°C. in bending a glass plate thinner than 6 mm and by 10–65 kcal/m$^2$·h·°C. in bending a thicker glass plate. The additional heating has the effect of preventing optical distortion of the bent glass plate in end regions by diminishing local and irregular concavities.

13 Claims, 1 Drawing Sheet

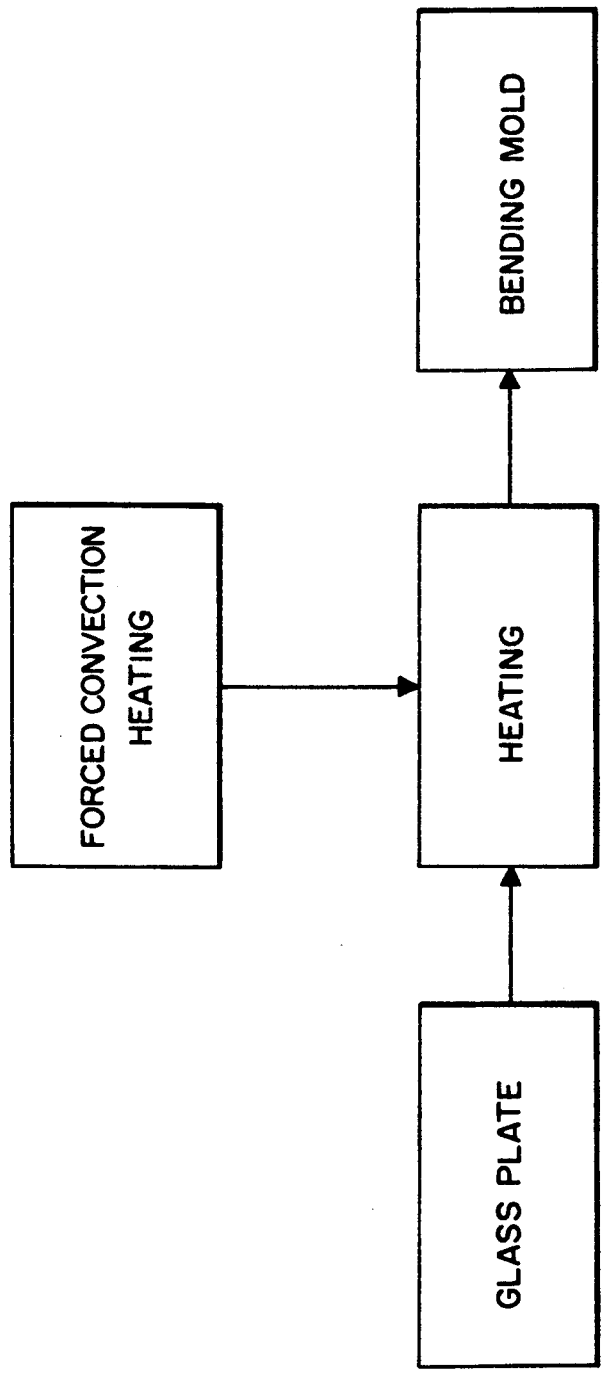

METHOD OF BENDING GLASS PLATE

BACKGROUND OF THE INVENTION

This invention relates to a method of bending a glass plate, and more particularly to an improved way of heating the glass plate to be bent. For example, the glass plate is bent to produce a building or vehicle window glass.

Bent glass plates are largely used as window glasses in recent buildings and automobiles and some other vehicles, and there is an increasing demand for bent glass plates of beautiful appearance. However, when a glass plate is bent to a large curvature it is often that images reflected in end regions of the bent glass plate are conspicuously distorted. An important cause of the distortion of the reflected images is local irregularities of the convex or concave surface of the bent glass plate and in particular local concavities in the convex surface. In general optical distortion of a bent glass plate augments as the glass plate is thicker and as the bent glass plate has a smaller radius of curvature.

With a view to preventing optical distortion of glass plates bent, e.g., by a press bending method or a sag bending method there are various proposals of modifying the configuration of the bending mold(s) or the manner of engagement of the heated glass plate with the mold(s). Besides, there are some proposals of nonuniform heating of a glass plate to be bent. For example, JP-A 56-22643 relates to intensified heating of a glass plate along the line of relatively sharp bend by using a heater strip printed on the glass plate along the intended bend line and proposes to form the heater strip in a curved pattern for the purpose of shaping the glass plate to a desired curvature on each side of the sharp bend line. On the other hand, JP-A 62-56327 proposes to weaken the heating of a nearly rectangular glass plate, which is to be bent by a sag bending method, in two opposite end regions along the longer edges of the glass plate by detachably applying a heat reflective coating to the glass surface in each of the end regions.

However, in the case of bending a relatively thin glass plate such that the bent glass plate has a radius of curvature not larger than 2000 mm or in the case of bending a glass plate not thinner than 6 mm so as to have a radius of curvature not larger than 3000 mm, the measures hitherto proposed are not fully effective for preventing the distortion of images reflected in end regions of the bent glass plate. In particular, when a nearly rectangular glass plate is bent such that two opposite edges of the glass plate become curved it is likely that images reflected in end regions of the bent glass plate along the other edges are considerably distorted.

SUMMARY OF THE INVENTION

It is an object of the present invention to provide an improved method of bending a glass plate, which may be thicker than 6 mm, into a predetermined shape having a radius of curvature not larger than 3000 mm, and not larger than 2000 mm when the glass plate is thinner than 6 mm, by which method the bending is accomplished without inducing significant optical distortion of the glass plate even in its end regions.

Generically, the present invention is a method of bending a glass plate into a predetermined shape having a radius of curvature not larger than 3000 mm by heating the glass plate in its entirety to a temperature sufficient for bending and bringing the heated glass plate into engagement with at least one bending mold, the method being characterized in that during the heating step at least one end region of the glass plate is additionally heated by forced convection such that the heat transfer coefficient on at least one major surface of the glass plate in the end region(s) becomes greater than in the remaining region by at least 5 kcal/m$^2$·h·°C.

In the present application, an end region of a glass plate means a belt-like region along and contiguous to an edge of the glass plate. In most cases the breadth of an end region ranges from 50 to 200 mm.

In the case of a glass plate thinner than 6 mm it is possible to bend the glass plate so as to have a radius of curvature not larger than 2000 mm. In this case the amount of increase in the heat transfer coefficient in the additionally heated end region(s) of the glass plate is limited to 50 kcal/m$^2$·h·°C. at the maximum, and the breadth of the end region(s) does not need to be greater than 150 mm.

In the case of bending a glass plate not thinner than 6 mm, the additional heating of any end region of the glass plate is made such that the amount of increase in the heat transfer coefficient is in the range from 10 to 65 kcal/m$^2$·h·°C. and preferably such that the heat transfer coefficient becomes maximum at a distance of 20–50 mm from the edge of the glass plate and gradually decreases toward the edge of the glass plate and toward the opposite border of the end region at a gradient not greater than 2 kcal/m$^2$·h·°C. per cm.

In the method according to the invention the primary heating of the glass plate in its entirety is made in a usual way by convective and radiant heat transfer, and the bending of the heated glass plate is made by a conventional method such as press bending, sag bending or gas hearth bending process.

According to the invention the glass plate under heating is additionally heated in any end region where distortion of reflected images is liable to occur if the glass plate is heated and bent by a known method. The additional heating is made by forced convection, and the degree of the additional heating is controlled so as to increase the heat transfer coefficient in the end region by an amount within a specified range. In the conventional methods the heating of a glass plate to be bent relies principally on natural convection. It seems that natural convection is favorable for uniform heating of the glass plate, but in reality the distribution of temperature and, hence, density of glass in the glass plate becomes nonuniform in end regions of the plate. The additional heating according to the invention relieves the unevenness of the glass density and has the effect of greatly reducing local and minute convexties and concavities in the convex and concave surfaces of the bent glass plate in its end regions. In particular, warping of the bent glass plate in terms of concavities in the convex surface are diminished to only 0.05 mm at the deepest. Therefore, images reflected in end regions of the bent glass sheet are not conspicuously distorted.

This invention is very useful for producing window glasses for buildings, automobiles and other vehiclces. A window glass produced by using this invention is free of configurational distortions, as well as optical distortions, in end regions and accordingly smoothly fits in the sash. The window glass presents a beautiful appearance, and, for example, in the case of an automobile door window glass the glass can be rolled up and down without creaking.

After heating and bending a glass plate by a method according to the invention it is optional whether to temper or to simply anneal the bent glass plate. The bent glass plate may be used as a single plate or as a component of a laminated or insulated glass.

The thought of this invention is applicable also to bending of a plate of a so-called organic glass such as polymethyl methacrylate.

The sole FIGURE illustrates the method of the invention.

DESCRIPTION OF THE PREFERRED EMBODIMENTS

Referring to the drawing, the method of the invention will now be described.

There is no strict restriction on the shape of the glass plate to be heated and bent by a method according to the invention. In practice, however, the most important use of the invention is for bending a glass plate having a tetragonal shape such as a rectangular shape or a trapezoidal shape, though it is also possible to bend a trigonal glass plate for use, for example, in a quarter window of an automobile.

The additional heating according to the invention is not necessarily made in every end region of the glass plate. For example, in the case of bending a nearly rectangular or trapezoidal plate of glass such that the two opposite edges of the glass plate become arcuate, it is suitable to make the additional heating in an end region along one of the remaining two edges and another end region along the opposite edge.

The additional heating is made by forced convection. For this purpose hot air is blown against at least one major surface of the glass plate in the selected end region(s) so as to produce a turburence of hot air on the glass surface. For example, the hot air is spouted from a double nozzle attached to a tube which is provided with a fan or connected to a compressor. It is preferable to blow hot air against the both major surfaces of the glass plate. Usually the temperature of the hot air is made higher than the temperature of the hot air atmosphere employed for the primary heating of the glass plate in its entirety.

The additional heating is not necessarily continued over the entire period of the primary heating of the glass plate in its entirety. The minimum duration of the additional heating is variable depending on the shape and thickness of the glass plate and the curvatures to which the heated glass plate is to be bent. In most cases a suitable duration of the additional heating is about a half of the duration of the primary heating or somewhat longer.

In bending a glass plate thinner than 6 mm the merits of the invention become apparent when the bent glass plate has a radius of curvature not larger than 2000 mm. When a glass plate thinner than 6 mm and as large as an ordinary automobile window is bent with a radius of curvature larger than 2000 mm, such as 2500 mm or 3000 mm, optical distortion of the bent glass plate is so slight that the distortion of reflected images is insignificat even in end regions of the glass plate.

In bending a glass plate thinner than 6 mm into a predetermined shape having a radius of curvature not larger than 2000 mm, the additional heating of any end region of the glass plate is performed such that the amount of the increase in the heat transfer coefficient on a major surface of the glass plate in the end region falls in the range from 5 to 50 kcal/m$^2$·h·°C. If the amount of the increase is less than 5 kcal/m$^2$·h·°C. the additional heating is not appreciably effective for diminishing concavities in the convex surface of the bent glass plate. On the other hand, if the amount of the increase exceeds 50 kcal/m$^2$·h·°C. the additional heating will possibly cause local deformation of the glass plate or degradation of the glass plate surface condition. It is preferred to control the amount of the increase within the range from 10 to 30 kcal/m$^2$·h·°C. In this case it suffices that the boundary of each end region of the glass plate to be additionally heated is at a distance of 150 mm from the edge of the glass plate, because in the case of a glass plate for use as an automobile window glass concavities in the convex surface of the bent glass plate are liable to appear within this distance from an edge of the glass plate and most largely at distances of 20–100 mm from the edge.

The effect of the additional heating on heat transfer coefficient is experimentally examined in advance. For example, blowing hot air against a major surface of the glass plate in an end region the rate of a rise in the glass surface temperature is measure by using a thermocouple embedded in a copper disc (e.g. 30 mm in diameter and 3 mm in thickness) which is attached to the glass plate in the center of the area of collision of the hot air against the glass surface to thereby find the relationship between the conditions of the blowing of hot air and the heat transfer coefficient.

It is desirable to make the additional heating such that the convex surface of the bent glass plate is free of concavities deeper than about 0.05 mm. If minute warping of an end region of the bent glass plate in terms of concavities in the convex surface exceeds 0.05 mm the distortion of reflected images becomes conspicuous, and the bent glass plate may not have a good appearance as an automobile window glass. It is preferable to make the bent glass plate free of concavities deeper than 0.03 mm in the convex surface.

In bending a glass plate not thinner than 6 mm the merits of the invention become apparent when the bent glass plate has a radius of curvature not larger than 3000 mm. When a glass plate not thinner than 6 mm and as large as a building window or a large-sized vehicle window is bent with a radius of curvature larger than 3000 mm, such as 3500 mm, optical distortion of the bent glass plate is so slight that the distortion of reflected images is almost insignificat even in end regions of the glass plate.

In bending a glass plate not thinner than 6 mm into a predetermined shape having a radius of curvature not larger than 3000 mm, the additional heating of any end region of the glass plate is performed such that the amount of the increase in the heat transfer coefficient on a major surface of the glass plate in the end region falls in the range from 10 to 65 kcal/m$^2$·h·°C. If the amount of the increase is less than 10 kcal/m$^2$·h·°C. the additional heating is not appreciably effective. If the amount of the increase exceeds 65 kcal/m$^2$·h·°C. the additional heating will possibly cause local deformation of the glass plate or degradation of the glass surface condition. It is preferred to control the amount of the increase within the range from 15 to 45 kcal/m$^2$·h·°C. In this case it suffices that the boundary of each end region of the glass plate to be additionally heated is at a distance of 200 mm from the edge of the glass plate, because in the case of a glass plate for use as an automobile window glass concavities in the convex surface of the bent glass plate are liable to appear within this distance from an edge of the glass plate and most largely at distances of 20–50 mm from the edge.

In bending a glass plate not thinner than 6 mm it is preferred to perform the additional heating of any end region of the glass plate such that the heat transfer coefficient becomes maximum at a distance of 20–50 mm from the edge of the glass plate and gradually decreases toward the edge and toward the opposite boundary of the end region at a gradient not greater than 2 kcal/m²·h·°C. per cm. That is, it is preferred to maximize the heat transfer coefficient in a region where reverse warping of the bent glass plate is most likely to occur. This is very effective for suppression of the reverse warping and hence for prevention of distortion of images reflected in the end region of the bent glass plate. If the gradient of the heat transfer coefficient is greater than 2 kcal/m²·h·°C. per cm there is a possibility that the glass plate breaks during bending or subsequent tempering. It is best that the aforementioned gradient of the heat transfer coefficient is not greater than 1.7 kcal/m²·h·° C. per cm.

Also in the case of bending a glass plate not thinner than 6 mm so as to have a radius of curvature not larger than 3000 mm, it is desirable and possible to make the additional heating according to the invention such that the convex surface of the bent glass plate is free of concavities deeper than 0.05 mm, and in many cases free of concavities deeper than 0.03 mm.

The method according to the invention is very useful for heating and bending glass plates not thicker than about 15 mm.

EXAMPLE 1

In a furnace provided with electrical radiant heaters, a rectangular plate of soda-lime glass 920 mm in length, 560 mm in width and 3.5 mm in thickness was heated in its entirety to about 660° C. During the heating the glass plate was additionally heated in its widthwise opposite end regions (that is, the two end regions were along and contiguous to the two longer edges of the rectangular glass plate, respectively) by blowing hot air against the both surfaces of the glass plate in each of the end regions. The breadth of each of the two end regions was about 130 mm. To each surface of the glass plate in each of the two end regions the hot air was spouted from a nozzle attached to a tube in which a fan was provided so as to produce turburence of the hot air on the glass surface. The additional heating was controlled so as to increase the heat transfer coefficient in each of the two end regions by about 5 kcal/m²·h·°C.

The heated glass plate was bent by using a pair of press bending molds such that the two shorter edges of the glass plate became arcuate with a radius of curvature of about 1600 mm. The bent glass plate was tempered by blowing cold air against the both surfaces of the glass plate.

On the convex surface of the bent and tempered glass plate the depths of minute concavities were measured with a dial gauge having a span of about 70 mm. In any region of the glass plate there were no concavities deeper than 0.02 mm.

To examine the degree of distortion of images reflected in the bent and tempered glass plate, a grid pattern defining 3 cm squares was drawn on a panel, and the image of the panel was projected on the convex surface of the glass plate, and the reflected image was photographed. On the photograph the length of each side of every square in the grid was measured to judge that the distortion of the reflected image is acceptable if the maximum of the measured lengths is about 1.3 times the actural length or shorter but unacceptable if the maximum of the measured lengths is about 1.6 times the actual length or still longer. As the result, the distortion of the reflected image was judged to be acceptable.

EXAMPLE 2

In a tunnel furnace a rectangular plate of soda-lime glass 920 mm in length, 560 mm in width and 4 mm in thickness was heated and bent by a conventional gas hearth process. During heating the glass plate in its entirety to about 670° C. the glass plate was additionally heated in its widthwise opposite end regions by blowing hot air against the both surfaces of the glass plate in each of the end regions. The breadth of each of the two end regions was about 150 mm. To each surface of the glass plate in each of the two end regions the hot air was spouted from a double nozzle connected to a compressor. The additional heating was controlled so as to increase the heat transfer coefficient in each of the two end regions by about 10 kcal/m²·h·°C. The bending of the heated glass plate was made such that the two shorter edges of the rectangular glass plate became arcuate with a radius of curvature of about 1400 mm. After bending the glass plate was tempered.

The bent and tempered glass plate was examined by the above described methods. In any region of the convex surface of the glass plate there were no concavities deeper than 0.03 mm, and the distortion of the reflected image was judged to be acceptable.

EXAMPLES 3 AND 4

In Examples 3 and 4 the process of Example 1 and the process of Example 2 were repeated, respectively, with modifications shown in Table 1. The bent and tempered glass plates were examined by the above described methods. The results are shown in Table 1, wherein the character "A" means that the distortion of the reflected image was acceptable and the character "C" unacceptable.

COMPARATIVE EXAMPLES 1 AND 2

The process of Example 1 was repeated with modifications shown in Table 1. The bent and tempered glass plates were examined by the above described methods. The results are shown in Table 1.

The above examples and comparative examples were supplemented by omitting tempering of the bent glass and examining the bent glass plates by the same methods. There were little differences in the results.

TABLE 1

|  | Glass Plate L × W (mm) | Glass Plate Thick. (mm) | Breadth of End Region (mm) | Increase in Heat Transfer Coefficient (kcal/m² · h · °C.) | Radius of Curvature (mm) | Maximum of Concavities in Convex Surface (mm) | Distortion of Reflected Image |
|---|---|---|---|---|---|---|---|
| Example 1 | 920 × 560 | 3.5 | 130 | 5 | 1600 | <0.02 | A |

TABLE 1-continued

|  | Glass Plate | | Breadth of End Region (mm) | Increase in Heat Transfer Coefficient (kcal/m²·h·°C.) | Radius of Curvature (mm) | Maximum of Concavities in Convex Surface (mm) | Distortion of Reflected Image |
| --- | --- | --- | --- | --- | --- | --- | --- |
|  | L × W (mm) | Thick. (mm) | | | | | |
| Example 2 | 920 × 560 | 4 | 150 | 10 | 1400 | <0.03 | A |
| Example 3 | 870 × 510 | 5 | 130 | 30 | 1600 | <0.03 | A |
| Example 4 | 560 × 560 | 5 | 100 | 50 | 1250 | <0.02 | A |
| Comp. Ex. 1 | 920 × 560 | 3.5 | 180 | 3 | 1600 | 0.20 | C |
| Comp. Ex. 2 | 920 × 560 | 4 | 160 | 60 | 1400 | 0.80 | C |

EXAMPLE 5

A rectangular plate of soda-lime glass 920 mm in length, 560 mm in width and 8 mm in thickness was heated, bent and tempered by the same method as in Example 1. The breadth of each of the two end regions where the additional heating was made was about 150 mm. In this case the additional heating was made such that the increase in the heat transfer coefficient in each of the two end regions maximized to about 20 kcal/m²·h·°C. at a distance of about 25 mm from a longer edge of the glass plate and such that the heat transfer coefficient gradually decreased toward that edge of the glass plate and toward the opposite boundary of the end region at a gradient of about 1.5 kcal/m²·h·°C. per cm.

The bending of the heated glass plate was made such that the two shorter edges of the glass plate became arcuate with a radius of curvature of about 2000 mm.

The bent and tempered glass plate was examined by the same methods as in Example 1. The results are shown in Table 2.

EXAMPLE 6

A rectangular plate of soda-lime glass 920 mm in length, 560 mm in width and 10 mm in thickness was heated, bent and tempered by the same method as in Example 2. The breadth of each of the two end regions where the additional heating was made was about 200 mm. In this case the additional heating was made such that the increase in the heat transfer coefficient in each of the two end regions maximized to about 20 kcal/m²·h·°C. at a distance of about 30 mm from a longer edge of the glass plate and such that the heat transfer coefficient gradually decreased toward that edge of the glass plate and toward the opposite boundary of the end region at a gradient of about 1.0 kcal/m²·h·°C. per cm.

The bending of the heated glass plate was made such that the two shorter edges of the glass plate became arcuate with a radius of curvature of about 3000 mm.

The bent and tempered glass plate was examined by the same methods as in Example 1. The results are shown in Table 2.

EXAMPLES 7 AND 8

In Examples 7 and 8 the process of Example 5 and the process of Example 5 were repeated, respectively, with modifications shown in Table 2. The bent and tempered glass sheets were examined by the same methods. The results are shown in Table 2.

COMPARATIVE EXAMPLES 3 AND 4

The process of Example 5 was repeated with modifications shown in Table 2. The bent and tempered glass plates were examined by the same methods. The results are shown in Table 2.

TABLE 2

|  | Glass Plate | | Heat Transfer Coefficient | | | Radius of Curvature (mm) | Maximum of Concavities in Convex Surface (mm) | Distortion of Reflected Image |
| --- | --- | --- | --- | --- | --- | --- | --- | --- |
|  | L × W (mm) | Thick. (mm) | Maximum Increase (kcal/m²·h·°C.) | Gradient | Position of Max. Increase, distance from glass edge (mm) | | | |
| Example 5 | 920 × 560 | 8 | 20 | 1.5 | 25 | 2000 | <0.03 | A |
| Example 6 | 920 × 560 | 10 | 20 | 1.0 | 30 | 3000 | <0.03 | A |
| Example 7 | 870 × 510 | 15 | 60 | 0.8 | 25 | 3000 | <0.03 | A |
| Example 8 | 560 × 560 | 6 | 15 | 2 | 30 | 1800 | <0.03 | A |
| Comp. Ex. 3 | 920 × 560 | 8 | 2 | 2 | 15 | 2000 | 0.70 | C |
| Comp. Ex. 4 | 920 × 560 | 10 | 70 | 1.5 | 120 | 3000 | 1.10 | C |

What is claimed is:

1. A method of bending a glass plate into a predetermined shape having a radius of curvature not larger than 3000 mm, the method having the steps of heating the glass plate in its entirety to a temperature sufficient for bending and bringing the heated glass plate into engagement with at least one bending mold, characterized in that during the heating step at least one end region of the glass plate is additionally heated by forced convection such that the heat transfer coefficient on at least one major surface of the glass plate in said at least one end region becomes greater than in the remaining region by at least 5 kcal/m²·h·°C.

2. A method of bending a glass plate thinner than 6 mm into a predetermined shape having a radius of curvature not larger than 2000 mm, the method having the steps of heating the glass plate in its entirety of a temperature sufficient for bending and bringing the heated glass plate into engagement with at least one bending mold, characterized in that during the heating step at least one end region of the glass plate is additionally heated by forced convection such that the heat transfer coefficient on at least one major surface of the glass plate in said at least one end region becomes greater than in the remaining region by an amount in the range from 5 to 50 kcal/m²·h·°C.

3. A method according to claim 2, wherein said at least one end region is along and contiguous to an edge of the glass plate and has a breadth not greater than 150 mm.

4. A method according to claim 2, wherein said amount of heat transfer coefficient is in the range from 10 to 30 kcal/m²·h·°C.

5. A method according to claim 2, wherein the additional heating of said at least one end region of the glass plate is performed by blowing a heated gas against the at least one major surface of the glass plate in said at least one end region.

6. A method according to claim 2, wherein said glass plate has a tetragonal shape, the additional heating of the at least one end region of the glass plate is made in an end region along and contiguous to one edge of the glass plate and another end region along and contiguous to the opposite edge of the glass plate.

7. A method of bending a glass plate not thinner than 6 mm into a predetermined shape having a radius of curvature not larger than 3000 mm, the method having the steps of heating the glass plate in its entirety to a temperature sufficient for bending and bringing the heated glass plate into engagement with at least one bending mold, characterized in that during the heating step at least one end region of the glass plate is additionally heated by forced convection such that the heat transfer coefficient on at least one major surface of the glass plate in said at least one end region becomes greater than in the remaining region by an amount in the range from 10 to 60 kcal/m²·h·°C.

8. A method according to claim 7, wherein said at least one end region is along and contiguous to an edge of the glass plate and has a breadth not greater than 200 mm.

9. A method according to claim 8, wherein the additional heating of said at least one end region of the glass plate is made such that the heat transfer coefficient in said at least one end region becomes maximum at a distance of 20–50 mm from said edge of the glass plate and gradually decreases toward said edge of the glass plate and toward the opposite boundary of the end region at a gradient not greater than 2 kcal/m²·h·°C. per cm.

10. A method according to claim 9, wherein said gradient is not greater than 1.7 kcal/m²·h·°C. per cm.

11. A method according to claim 7, wherein said glass plate has a tetragonal shape, the additional heating of the at least one end region of the glass plate is made in an end region along and contiguous to one edge of the glass plate and another end region along and contiguous to the opposite edge of the glass plate.

12. A method according to claim 7, wherein said amount of heat transfer coefficient is in the range from 15 to 45 kcal/m²·h·°C.

13. A method according to claim 7, wherein the additional heating of said at least one end region of the glass plate is performed by blowing a heated gas against the at least one major surface of the glass in said at least one end region.

* * * * *